Patented Oct. 25, 1938

2,134,013

UNITED STATES PATENT OFFICE 2,134,013

PROCESSES OF PHOSPHATE CONVERSION

John W. Turrentine, Washington, D. C.

No Drawing. Application February 9, 1935,
Serial No. 5,881

5 Claims. (Cl. 71—39)

This invention relates to the conversion of phosphate rock and other phosphatic materials into products of enhanced agricultural and plant food value, and more specifically, in that conversion to the utilization of the more volatile acids, such as hydrochloric and nitric acids. It relates furthermore to improved methods of applying these acids thereto whereby valuable products are obtained and economies effected.

The application of hydrochloric acid to this conversion, as heretofore practiced, yields a product of such a content of highly hygroscopic calcium chloride that its removal is required to render the product merchantable. This is accomplished by converting the water-soluble phosphatic component, monocalcium phosphate, into the insoluble, dicalcium phosphate, which is then removed from the calcium chloride in solution by filtering. To effect this conversion and precipitation, the introduction of some extraneous base, such as lime, is required, with the loss of the proportionate amount of available acidity. Since the purpose of acid use is the dissolution of phosphate rock and the acid used represents a major item of expense, it is obvious that this deliberate neutralization of acid by extraneous bases represents an inefficient use of reagents.

In the present invention these objections to present practice are overcome. The acid employed is recovered in part at least instead of remaining as a diluent, thereby increasing the plant-food concentration of the finished product and proportionately reducing its distribution costs. The acid recovered is recycled in the process, is applied to fresh portions of rock, and its neutralization is therefore effected with phosphate rock itself instead of by the introduction of extraneous bases. This represents a large increase in the efficiency of acid use and a corresponding decrease in cost. A basic phosphate is produced by acid elimination rather than by acid neutralization. Various other advantages will be apparent from the hereinafter disclosures.

To illustrate this invention I employ hydrochloric acid in its action on phosphate rock. As the preferred source of acid I treat potassium chloride with sulfuric acid to yield potassium sulfate and hydrochloric acid gas. The HCl as gas, or after absorption in water to the desired concentration, is reacted with phosphate rock, in proportions and to yield the products indicated by the following equations:

1. $(CaO)_{3.5}.P_2O_5 + 7HCl =$
$2H_3PO_4 + 3.5CaCl_2 + .5H_2O$
2. $(CaO)_{3.5}.P_2O_5 + 5HCl + 3H_2O =$
$CaH_4P_2O_8.H_2O + 2.5CaCl_2.H_2O$

The reaction products derived as indicated (solutions or mixed solutions and solid, depending on the proportion of water present) when heated to a temperature of 100° C. or over (preferably 150° C.) evolve $H_2O$ and HCl, as indicated by the following equation:

3. $CaH_4(PO_4)_2.H_2O + CaCl_2 =$
$2CaHPO_4 + H_2O + 2HCl$ with the formation of dibasic calcium phosphate or its equivalent, or, at higher temperatures, phosphates of even higher basicity, as indicated by the following equation:

4. $CaH_4(PO_4)_2 + 2CaCl_2 = Ca_3P_2O_8 + 4HCl$

Thus, with increase in temperature the elimination of $CaCl_2$ (through conversion to the volatile HCl) continues progressively,—at 150° C., 40 per cent, and at 500° C. 78 per cent of the HCl equivalent has been evolved, with the corresponding increase in the basicity of the product. At the higher temperatures, however, there is a tendency toward the formation of phosphates of decreasing availability, that tendency, apparently, being a function of the fluorine content of the conversion product, for which reason the lower temperatures are preferred as being more easily attained while affording satisfactory results.

The phosphatic product obtained at 150° C. in composition approximates 30 per cent $P_2O_5$, equivalent to 58 per cent $CaHPO_4$, and 37 per cent $CaCl_2$, with residues representing the impurities of the rock from which derived. The water-solubility of a part of the phosphatic component (obtained at 150° C.) differentiates it from ordinary dicalcium phosphate and characterizes it as a basic calcium phosphate chloride. Thus between the temperatures of 100° and 500° C. from 35 to 80 per cent of the HCl employed is recovered for reuse and the $CaCl_2$ component is proportionately reduced to yield a basic calcium phosphate chloride product that is both novel and is characterized by the solubility in water of a substantial portion of its phosphatic component.

The volatile products evolved during the heat treatment are water vapor, initially in particular, and hydrogen chloride; thus, at lower temperatures, i. e. on initial heating, water vapor is evolved predominantly with little acid, which fact provides the means of regulating the amount of water maintained in the system, if such be desired. Or the two, acid and water, may be readily condensed to aqueous HCl solution, which can be employed as produced, or it can be fortified by absorbing therein the more concentrated HCl gases from the original source. Thus are afforded HCl gas mixtures and aqueous solutions of any desired concentration, providing wide latitude in procedures.

Of the various possible procedures lying within the scope of this invention, three will be described as illustrative, without restricting the invention thereto, however.

1. To 1140 parts of ground phosphate rock of 33 per cent $P_2O_5$ content is added 495 parts of HCl as an aqueous solution of 38 per cent HCl, the two being thoroughly intermixed to yield a slurry (Equa. 2) which on denning sets up to a solid. The denned product is then heated, preferably in a closed, mechanical furnace or drier, to a temperature of 150° C., the evolved HCl gas is drawn off for recovery and reuse and the heated residue is discharged as the finished product. Or, the denning operation may be omitted and the slurry charged directly into the heater, as described, to yield the same result.

Obviously, other strengths of HCl solution may be employed, 38 per cent being stipulated as yielding a slurry which on denning sets up to a solid and thereafter admits of being handled as a solid; further, the more concentrated the acid, the less is the proportionate volume of water subsequently to be evaporated.

The apparatus employed in adding acid to rock is any appropriate mixing device but preferably is that type employed in superphosphate manufacture with sulfuric acid; that employed in heating the mixture again is any appropriate type, vertical, sloping or horizontal, but preferably is the closed, externally fired type designed to move the charge continuously and automatically from entrance to exit and in the direction of increasing temperatures and with gas exit.

By an alternative procedure modified to avoid the intermediate condensation of HCl to aqueous solution, the gaseous HCl is applied to ground phosphate rock, preferably countercurrentwise to effect absorption and interaction (Equa. 2), the reaction product then being heated as described. The apparatus is of that type designed to bring finely comminuted solids into reaction contact with a gas. This may be so operated and more or less integrally combined with the heater as to constitute a single unit with a hot and a cold zone, in the former there being absorbed the HCl gas that has been evolved in the latter; thus, the HCl employed, in part at least, is undergoing continuous liberation and distillation from the hot zone and condensation and absorption in the cold zone (with additions of HCl gas from the original source, as described).

2. To pebble, crushed or granular, phosphate rock there is applied, preferably by percolation or continuous, countercurrent flow, an amount of aqueous HCl solution (23 per cent HCl) in such amount as to constitute a ratio of 425 parts of rock (basis 33 per cent $P_2O_5$) to 247 parts of HCl, to yield a solution of dissolution products substantially saturated therein, from which insoluble matter is separated and to which there is then added, by countercurrent absorptive flow, a quantity of gaseous HCl equivalent to 248 parts or to substantial saturation therein. The resulting solution with fortified HCl content is then applied to 715 parts of ground phosphate rock with mixing to yield a slurry which is then heated as described under (1).

While acid of 23 per cent HCl is specified as preferred since it yields a solution approaching saturation, at 25° C., in dissolution products, it is obvious that other concentrations can be employed; further, that batch, as contrasted with continuous, countercurrent processing can be applied, as for example, by dissolving ground rock in the acid; that in this initial step low grade rock can be used to advantage in the place of the high grade stipulated, the ratios of acid to rock employed being adjusted appropriately; that acid absorption from the gas phase may be combined with rock dissolution by passing the gas into reactive contact with the rock in the presence of water so regulated in amount as to yield the desired product, and in various other ways the procedures may be modified without exceeding the scope of this invention.

The action of nitric acid, in gaseous or aqueous solution form, is analogous to that of hydrochloric acid, with important differences, however. Nitric acid is more soluble in water than hydrochloric acid, simplifying the development of high concentration of solutions employed with decrease in water requirement. Calcium nitrate, unlike calcium chloride, has an established market value and represents a merchantable component of the product instead of a diluent. However, its decomposition in part is justified as increasing the reagent value of the acid employed and as decreasing the hygroscopicity of the product, thereby contributing enhanced stability and physical properties. But only so far do the analogies extend, as hereinafter disclosed.

The nitric acid ($HNO_3$) dealt with in the present illustration is that which is derived from heating the reaction product, as presently described. As the ultimate or original source of nitrate nitrogen from which $HNO_3$ is derived, however, the oxidation of ammonia by the established procedure is preferred with the marked and novel difference, however, that instead of producing an aqueous solution of $HNO_3$ as the intermediate product, as is commonly practiced, I omit this step and proceed directly to the production of the desired, intermediate, reaction product, namely monocalcium phosphate (or phosphoric acid) and calcium nitrate.

By this novel procedure the products of ammonia oxidation in air, a gas mixture containing NO, $NO_2$ (or $N_2O_4$), $H_2O$, $O_2$ and $N_2$ is brought directly into reaction contact with phosphate rock to yield the desired intermediate product. The overall reaction involved is illustrated by the equation:

While water is an essential reactant, it need not be present in amounts to constitute a separate liquid phase. However, the rate of reaction is promoted if it be present in such amount, since the desired reactions take place on the surfaces of phosphate rock particles forming a protective coating of reaction products which retards the reaction rate. It is therefore advantageous (although not necessary) to have present sufficient water to dissolve away the said products as rapidly as formed, and to apply such water streamwise countercurrent to the flow of the reactant gases, thus maintaining an exposure thereto of fresh, reactive surfaces. In this manner a quantitative reaction between the oxides of nitrogen and the phosphate rock is readily attained.

The solution resulting is one predominantly of monocalcium phosphate, (or phosphoric acid) and calcium nitrate with equilibrium concentrations of phosphoric and nitric acids. It is readily obtained of a concentration approaching saturation.

Such a solution it has been found is an efficient absorbent of nitric acid. It is accordingly so applied, being brought into absorptive, countercurrent contact flow against a stream of nitric acid gas (from the heat treatment of the reaction product), to yield a solution of predominantly phosphoric acid and calcium nitrate content, of such a concentration therein that upon the addition thereto of ground phosphate rock a slurry of desired characteristics is obtained. This product, of predominant monocalcium phosphate and calcium nitrate content, (with or without denning) is then heated for the volatilization of $HNO_3$ and the formation of a basic calcium phosphate nitrate.

To illustrate this feature of the herein disclosed invention the following example is given:

3. Upward through a bed of phosphate particles is passed a stream of nitrogen oxides (from an ammonia burner) preferably under pressure, while downward therethrough is passed a stream of water, (or dilute solution of $HNO_3$ or solution products), so regulated in amount that upon issuance therefrom it is, preferably, substantially saturated with the reaction products, (Equa. 5). The phosphate particles undergo rapid attrition, particularly in the region of gas entrance, the bed being maintained by the addition of phosphate particles. Insoluble constituents of the rock are removed as suspended matter in the issuing solution or by other means depending on the proportion of such and the type of containers employed. Provision is made for the oxidation of the NO constituent of the gas mixture to $NO_2$, as usual, by the adoption of multiple (3) stage application of the said gas with interposed reoxidation chambers, as desired, countercurrent flow being maintained with respect to each and all stages; i. e., the dilute solution obtained in the final, is advanced progressively through the intermediate, to the first stage.

This solution is then fortified, with respect to its acid content, by being applied to the absorption of or mixed with the nitric acid evolved on heating the final product and is then intermixed with the required proportions of ground phosphate rock as hereinbefore described, the proportions, the procedures and objectives being analogous to those hereinbefore illustrated with HCl application; or, it may be fortified with respect to its acid content by being applied as an absorbent of nitrogen oxide gases, with or without phosphate rock being present, when so applied being a more efficient absorbent of said oxides than a water solution of nitric acid of equivalent nitrogen content.

Various modifications in procedures yield the final objectives; e. g., aqueous nitric acid may be applied directly to ground phosphate rock as illustrated under (1), or to granular phosphate rock as illustrated under (2); ground phosphate rock in water suspension may be employed as an absorbent for nitrogen oxides and the ratio of water to solid may be so adjusted as to yield a slurry of reaction products which, on denning, sets up to a solid, and the heat treatment may be so varied as to yield a final product of any desired phosphate-nitrate ratio.

Since calcium nitrate has an established market value, should it be deemed preferable to market such instead of decomposing it in part, the heat treatment may be omitted and the solid product of monocalcium phosphate and calcium nitrate, with or without drying, may be "conditioned" by admixture therewith of other materials, preferably of fertilizer value, which will reduce, by chemical or physical reaction, the hygroscopicity of the calcium nitrate constituent to yield a stable product of enhanced merchantable properties, to which end calcium cyanamid and potassium sulfate, for example, lend themselves to advantage. Or, the reaction products may be reacted with ammonia (or ammonia and carbon dioxide) to yield a basic phosphate and ammonium nitrate, as illustrated by the following equation:

$$CaH_4P_2O_8 + Ca(NO_3)_2 + 2NH_3 = 2CaHPO_4 + 2NH_4NO_3$$

from which the ammonium nitrate may be recovered as a side product, if desired.

Since concentrated nitric acid is obtainable in the heat treatment of the reaction products, it may constitute a side product, if such be desired, of phosphate production, when so produced representing a convenient and novel method of obtaining the concentrated acid from initially dilute nitrogen oxide gas mixtures as produced by the oxidation of ammonia in air or from other sources.

In this patent application the term, "available", as applied to phosphates, is used in the agronomic sense, and the term, "basic", refers to phosphates the $Ca/P_2O_5$ ratio of which exceeds that of the mono-basic calcium phosphate.

I claim:—

1. A method of making stable phosphatic fertilizers which comprises treating phosphate rock with a volatile inorganic acid of the group consisting of hydrochloric acid, nitric acid and oxides of nitrogen in amount sufficient to yield a water-soluble product, in the presence of water in such proportion as to produce a product predominantly in solid form, and thereafter heating the reaction product to drive off a portion of the reacted acid and to produce a calcium phosphate product having a ratio of calcium, other than calcium stoichiometrically equivalent to the volatile acid radical, to phosphorus substantially equivalent to dicalcium phosphate.

2. A method of making stable phosphatic fertilizers which comprises treating phosphate rock with nitric acid in amount sufficient to yield a water-soluble product, in the presence of water in such proportion as to produce a product predominantly in solid form, and thereafter heating the reaction product to drive off a portion of the reacted acid and to produce a calcium phosphate product having a ratio of calcium, other than calcium stoichiometrically equivalent to the volatile acid radical, to phosphorus substantially equivalent to dicalcium phosphate.

3. A method of making stable phosphatic fertilizers which comprises treating phosphate rock with oxides of nitrogen in amount sufficient to yield a water-soluble product, in the presence of water in such proportion as to produce a product predominantly in solid form, and thereafter heating the reaction product to drive off a portion of the reacted acid and to produce a calcium phosphate product having a ratio of calcium, other than calcium stoichiometrically equivalent to the volatile acid radical, to phosphorus substantially equivalent to dicalcium phosphate.

4. A method of making stable phosphatic fertilizers which comprises treating phosphate rock with hydrochloric acid in amount sufficient to yield a water-soluble product, in the presence of water in such proportion as to produce a product predominantly in solid form, and thereafter heating the reaction product to drive off a portion of the reacted acid and to produce a calcium phosphate product having a ratio of calcium, other than calcium stoichiometrically equivalent to the volatile acid radical, to phosphorus substantially equivalent to dicalcium phosphate.

5. A method of making stable phosphatic fertilizers which comprises reacting phosphate rock with a volatile inorganic acid of the group consisting of hydrochloric acid, nitric acid and oxides of nitrogen in amount sufficient to yield a water-soluble product, in the presence of water in such proportion as to yield a substantially saturated solution of reaction products, separating insoluble residues from the solution, absorbing a further portion of the volatile inorganic acid in said solution, reacting the solution with a further portion of phosphate rock to produce a reaction product predominantly in solid form, and thereafter heating the reaction product to drive off a portion of the reacted acid and to produce a calcium phosphate product having a ratio of calcium, other than calcium stoichiometrically equivalent to the volatile acid radical, to phosphorus substantially equivalent to dicalcium phosphate.

JOHN W. TURRENTINE.